United States Patent
Hamdi et al.

(10) Patent No.: US 10,680,879 B2
(45) Date of Patent: Jun. 9, 2020

(54) WWAN-ENABLED REMOTE SWITCH MANAGEMENT SYSTEM

(71) Applicant: Dell Products L.P., Round Rock, TX (US)

(72) Inventors: Rabah S. Hamdi, Jonestown, TX (US); Andrew Blake Berry, Austin, TX (US); Joseph Burton Farrell, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 15/615,094

(22) Filed: Jun. 6, 2017

(65) Prior Publication Data
US 2018/0351881 A1    Dec. 6, 2018

(51) Int. Cl.
*H04L 12/24*    (2006.01)

(52) U.S. Cl.
CPC .......... *H04L 41/08* (2013.01); *H04L 41/0803* (2013.01); *H04L 41/0806* (2013.01)

(58) Field of Classification Search
CPC .. H04L 41/08; H04L 41/0803; H04L 41/0806
See application file for complete search history.

(56) References Cited

U.S. PATENT DOCUMENTS

| | | | | |
|---|---|---|---|---|
| 5,742,820 A * | 4/1998 | Perlman | ................. | H04L 45/02 707/610 |
| 2002/0069262 A1* | 6/2002 | Rigori | ..................... | H04L 29/06 709/218 |
| 2013/0281058 A1* | 10/2013 | Obaidi | .................. | H04W 12/06 455/411 |
| 2014/0280834 A1* | 9/2014 | Medved | ................ | H04L 47/122 709/223 |
| 2014/0313882 A1* | 10/2014 | Rucker | ................... | H04W 4/70 370/219 |
| 2017/0013441 A1* | 1/2017 | Manik | .................... | H04W 8/183 |
| 2017/0289184 A1* | 10/2017 | C | ........................ | H04L 63/1425 |

* cited by examiner

*Primary Examiner* — Kevin C. Harper
(74) *Attorney, Agent, or Firm* — Haynes and Boone, LLP

(57) ABSTRACT

A Wireless Wide Area Network (WWAN)-enabled remote switch management system includes a management device having a management device WWAN communication subsystem that is configured to transmit management commands from the management device through a WWAN. The WWAN-enabled remote switch management system also includes a switch device having a chassis. A switch device wired communication subsystem is located in the chassis, coupled to a Local Area Network (LAN), and is not coupled to the Internet. A switch device WWAN communication subsystem is located in the chassis and is configured to receive management commands from the management device through the WWAN. A switch management engine is located in the chassis, coupled to the switch device WWAN communication subsystem, and is configured to receive the management commands from the switch device WWAN communication subsystem, and execute the management commands to perform a management action on the switch device.

20 Claims, 7 Drawing Sheets

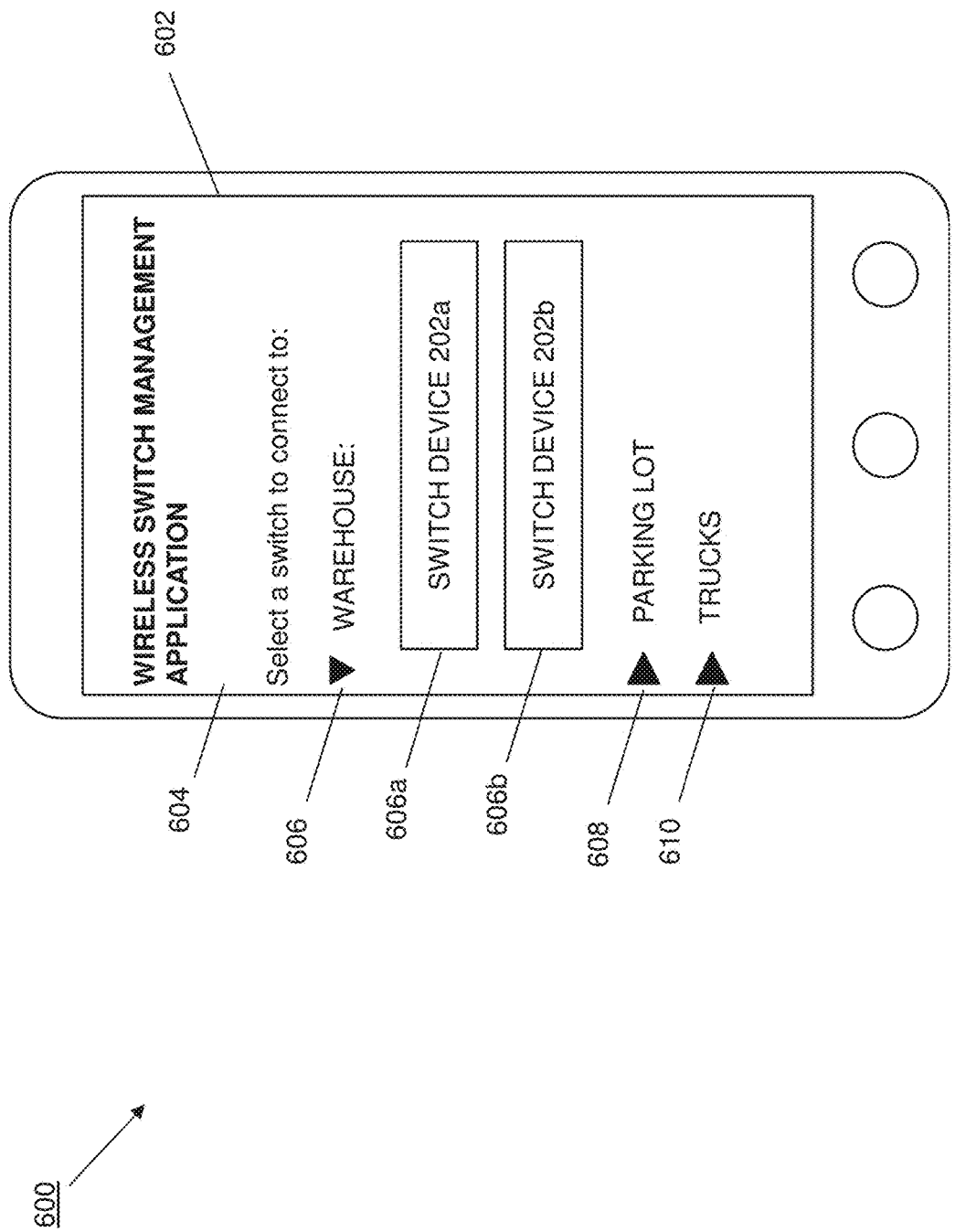

WWAN-ENABLED REMOTE SWITCH MANAGEMENT SYSTEM

BACKGROUND

The present disclosure relates generally to information handling systems, and more particularly to the remote management of switch information handling systems via Wireless Wide Area Network (WWAN) communications.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often connected together in Local Area Networks (LANs) in order to provide for a variety of network functionality known in the art. For example one or more switch devices may be connected to computing devices, access points, cameras, and/or other subsystems in order to provide a LAN. Typically, the switch device(s) utilized in LANs must be managed in order to ensure desired performance, security, and/or other characteristics in the LAN. In many situations, the switch device(s) (and the LAN) may be connected to the Internet via a wired connection, which typically allows management access to the switch device(s) (e.g., via the Internet) in order to provide for the management discussed above. However, in situations where a LAN is provided in a remote area without access and/or the ability to connect to the Internet, the management of switch device(s) providing the LAN raises a number of issues. For example, a switch device connected to one or more cameras in a remote area (e.g., on a utility pole, in a warehouse, etc.), or providing a LAN in a developing country (e.g., at a hospital or other medical center), may simply be unable to access the Internet due to the lack of communication infrastructure available (i.e., the presence of an wired connection to the Internet), and the costs of providing such communications infrastructure can be prohibitive. In such situations, the only option for managing the switch devices that provide such remote LANs is to locally connect a management device directly to the LAN (or a separate management network that is provided with or alongside that LAN). As such, the management of remote switch device requires that the management device (and network administrator) be co-located with the LAN.

Accordingly, it would be desirable to provide an improved remote switch management system.

SUMMARY

According to one embodiment, a switch Information Handling system (IHS) includes a chassis; a switch device wired communication subsystem that is located in the chassis, that is coupled to a Local Area Network (LAN), and that is not coupled to the Internet; a switch device WWAN communication subsystem that is located in the chassis and that is configured to receive management commands from the management device through the WWAN; and a switch processing system that is located in the chassis and that is coupled to the switch device WWAN communication subsystem; a switch memory system that is located in the chassis, that is coupled to the switch processing system, and that includes instructions that, when executed by the switch processing system, cause the switch processing system to: receive, through the switch device WWAN communication subsystem, management commands from a management device; and execute the management commands to perform a management action.

BRIEF DESCRIPTION OF THE DRAWINGS

FIG. 6A is a screen shot view illustrating an embodiment of a switch device connection screen displayed on the management device of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
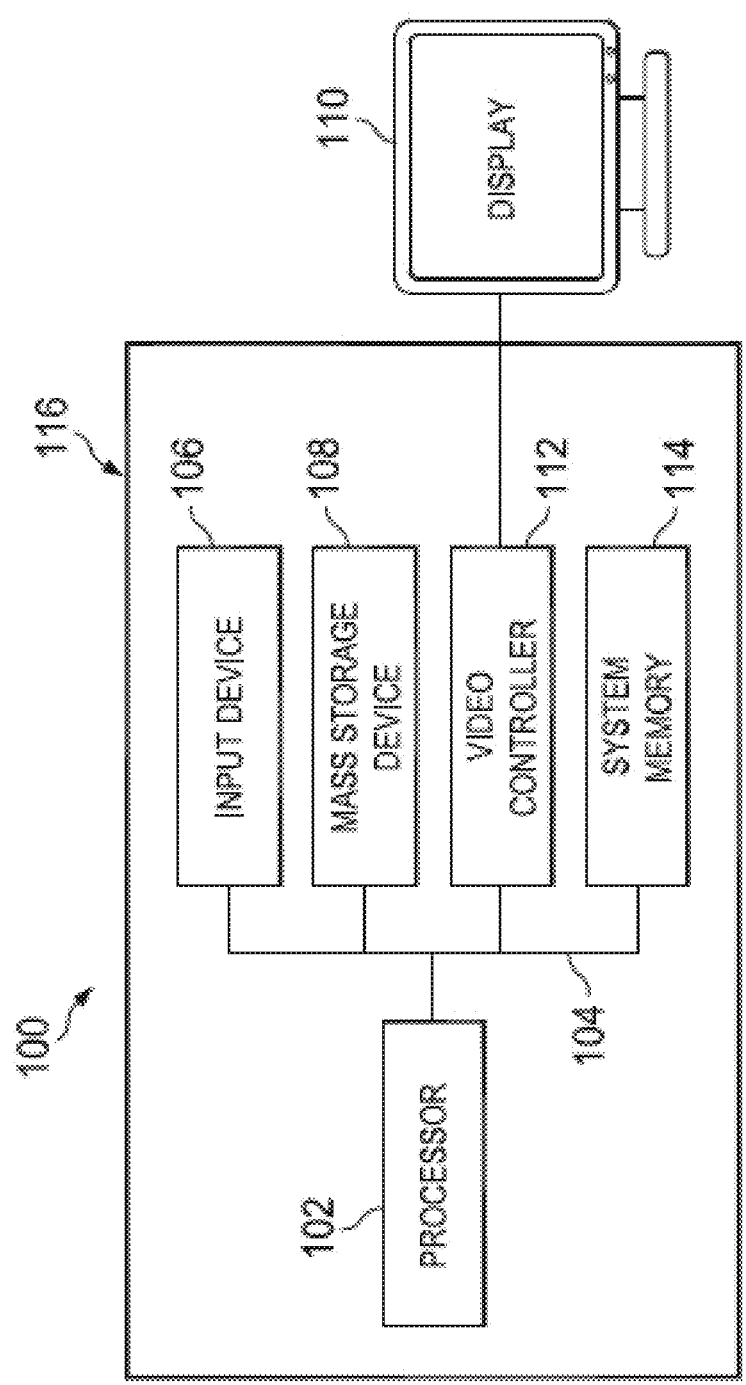
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
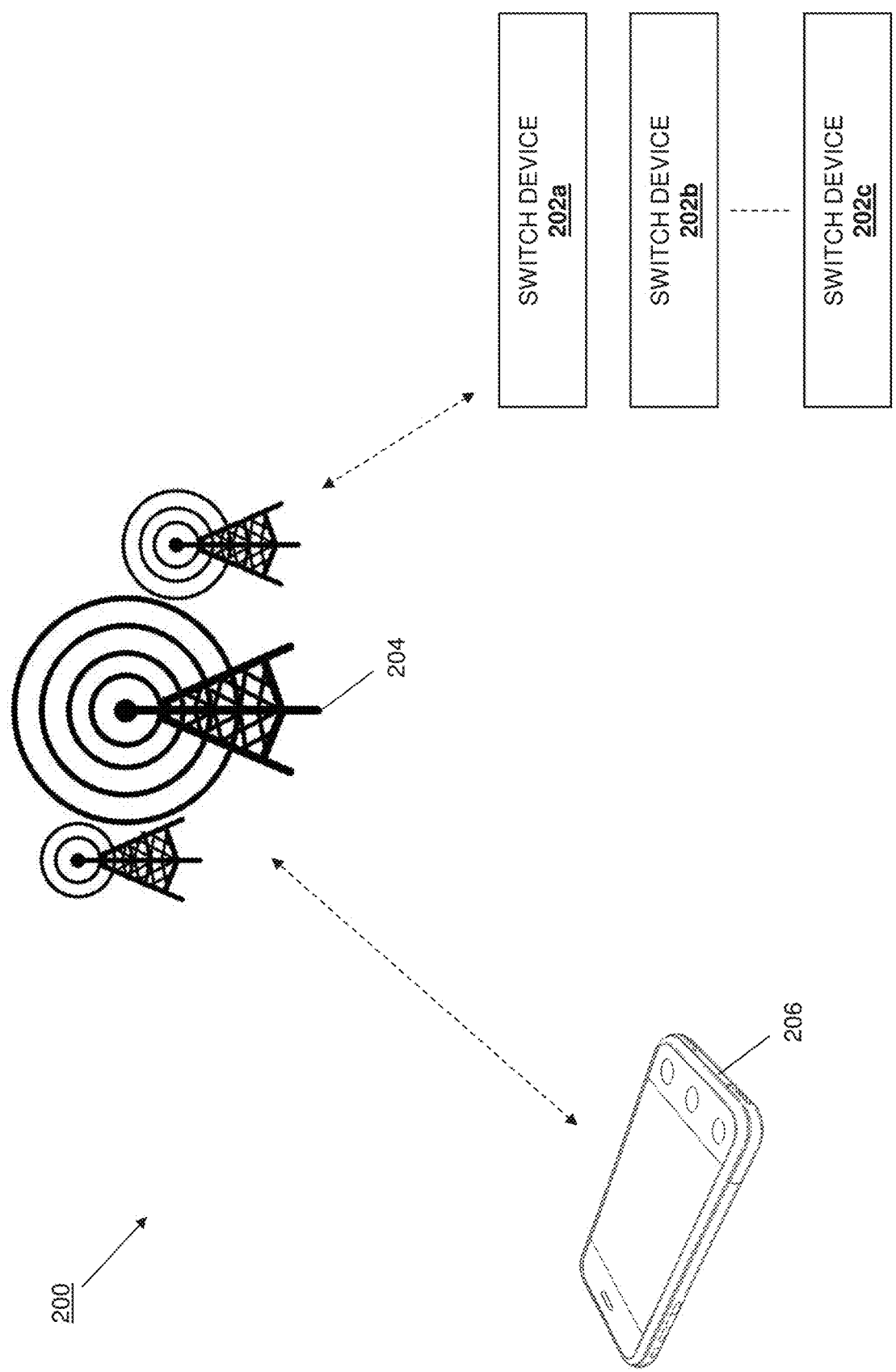
FIG. 2 is a schematic view illustrating an embodiment of a WWAN-enabled remote switch management system.

Referring now to FIG. 2, an embodiment of a Wireless Wide Area Network (WWAN)-enabled remote switch management system 200 is illustrated. In the illustrated embodiment, the WWAN-enabled remote switch management system 200 includes one or more switch device(s) such as, for example, the switch device 202a, the switch device 202b, and up to the switch device 202c, that may be coupled together and/or to other computing devices to provide a Local Area Network (LAN). While a plurality of switch devices are illustrated in the WWAN-enabled remote switch management system 200, one of skill in the art in possession of the present disclosure will recognize that LANs may include only one switch device, or more switch devices than illustrated in FIG. 2, and the provisioning of any number of switch devices in the WWAN-enabled remote switch management system 200 that operate similarly to the switch devices discussed below will fall within the scope of the present disclosure as well. In an embodiment, any or all of the switch devices may be the IHS 100 discussed above with reference to FIG. 1, and/or may include some or all of the components of the IHS 100. In the specific embodiments discussed below, the switch device(s) 202a-c are described as being connected together and to a variety of other devices (e.g., access point devices, cameras, and/or other computing devices) in order to provide the LAN, but one of skill in the art will recognize that switch devices may be coupled to almost any computing device in a LAN while remaining within the scope of the present disclosure.

In the illustrated embodiment, a WWAN infrastructure 204 is configured to communicate with the switch device(s) 202a-c, as discussed in further detail below. The WWAN infrastructure 204 is illustrated and described below as a cellular communications infrastructure including one or more cellular communications towers. However, other WWAN infrastructure elements may be provided in the WWAN-enabled remote switch management system 200 while remaining within the scope of the present disclosure as well. In the illustrated embodiment, a management device 206 is configured to communicate via the WWAN infrastructure 204 as well, discussed in further detail below. In an embodiment, the management device 206 may be the IHS 100 discussed above with reference to FIG. 1, and/or may include some or all of the components of the IHS 100, and in the specific embodiments discussed below, is provided by a mobile phone. However, one of skill in the art in possession of the present disclosure will recognize that the management device 206 may be provided by a variety of WWAN-communication-capable devices such as WWAN-communication-capable laptop/notebook computing devices, WWAN-communication-capable tablet computing devices, and/or other WWAN-communication-capable management devices known in the art that are configured to provide management commands, display management information, and/or perform any of the other operations of the management devices discussed below. While a specific WWAN-enabled remote switch management system has been illustrated and described, one of skill in the art in possession of the present disclosure will recognize that a variety of different devices and/or device configurations (other than those illustrated in FIG. 2) may be utilized to provide a WWAN-enabled remote switch management system that will benefit from the teachings of the present disclosure and thus fall within its scope as well.

Figure 3:
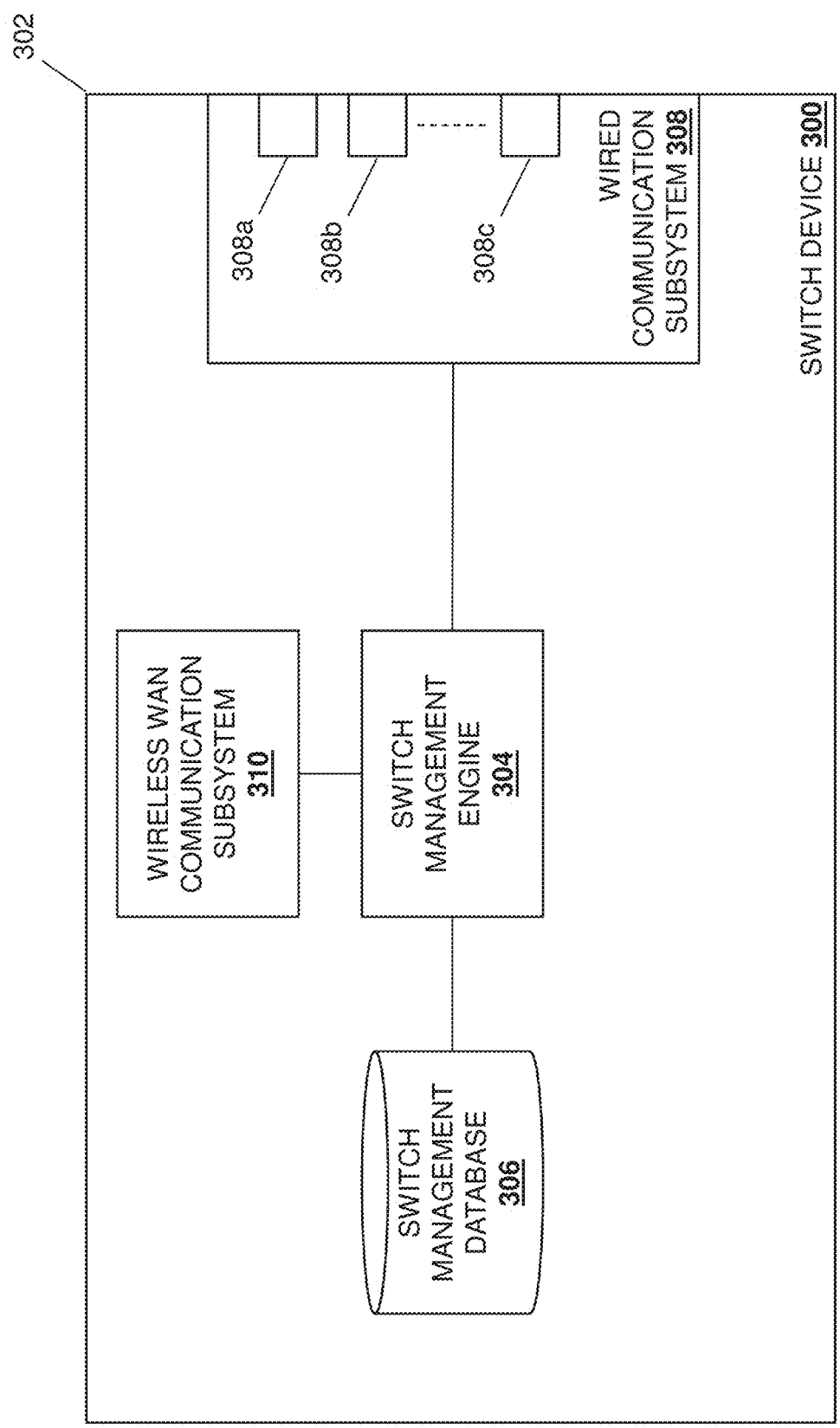
FIG. 3 is a schematic view illustrating an embodiment of a switch device used in the WWAN-enabled remote switch management system of FIG. 2.

Referring now to FIG. 3, an embodiment of a switch device 300 is illustrated that may be any of the switch devices 202a-c discussed above with reference to FIG. 2. As such, the switch device 300 may be the IHS 100 discussed above with reference to FIG. 1, and/or may include some or all of the components of the IHS 100. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an switch management engine 304 that is configured to perform the functions of the switch management engines and switch devices discussed below.

The chassis 302 may also house a storage device (not illustrated, but which may include the storage device 108 discussed above with reference to FIG. 1) that is coupled to the switch management engine 304 (e.g., via a coupling between the storage device and the processing system) and that includes an switch management database 306 that stores data and/or other information utilized to provide the functionality discussed below. The chassis 302 may also house a wired communication subsystem 308 that is coupled to the switch engine 304 (e.g., via a coupling between the wired communication subsystem 308 and the processing system) and that may include a Network Interface Controller (NIC), a Local Area Network (LAN) On Motherboard (LOM), and/or other communication components known in the art. In a specific embodiment, the communication subsystem 308 includes ports 308a, 308b, and up to 308c that coupled to wired connections that are utilized for providing the LAN discussed below. As such, the ports 308a-c may be coupled to cameras, access points, computing devices (e.g., desktop computing devices), and/or a variety of other LAN subsystems known in the art. However, as also discussed below, the present disclosure envisions use of the switch device 300 in situations where a wired Internet connection is not available via the ports 308*a-c* such as, for example, when the switch device 300 does not include any connection to a wired Internet service/network provider.

The chassis 302 may also house a Wireless Wide Area Network (WWAN) communication subsystem 310 that is coupled to the switch engine 304 (e.g., via a coupling between the WWAN communication subsystem 310 and the processing system) and that may include a cellular communications processing device such as a cellular System on a Chip (SoC), as well as a storage device storing a unique identifier such as a Subscriber Identity Module (SIM) card storing a SIM number. For example, the SIM card may be a universal SIM card that is compatible with a variety of WWAN networks. In some embodiments, the cellular communications processing device may include a direct connection to the processing system in the switch device 300 (e.g., the processing system that provides the switch management engine 304), which may be provided as a hardware connection between the cellular communications processing device and the processing system that may include a predefined management layer (e.g., a logical control management channel/layer) that interprets the WWAN communications received through the WWAN communication subsystem 310 and provides those interpreted communications to the processing system to allow those commands to be executed.

In a specific embodiment, the WWAN communicate on subsystem 310 may include antennas and/or other WWAN subsystems that are configured to utilize WWANs such as Long Term Evolution (LTE) networks, Worldwide Interoperability for Microwave Access (WiMAX) networks, Universal Mobile Telecommunications System (UMTS) networks, the Code Division Multiple Access version of International Mobile Telecommunications (IMT) for the year 2000 (CDMA2000) networks, Global System for Mobile Telecommunications (GSM) networks, Cellular Digital Packet Data (CDPD) networks, Mobitex networks, and/or other WWAN technologies that would be apparent to one of skill in the art in possession of the present disclosure While a specific embodiment of a switch device has been illustrated and described, one of skill in the art in possession of the present disclosure will recognize that switch devices may include a variety of other components for providing conventional switch device functionality, as well as the functionality discussed below, while remaining within the scope of the present disclosure.

Figure 4:
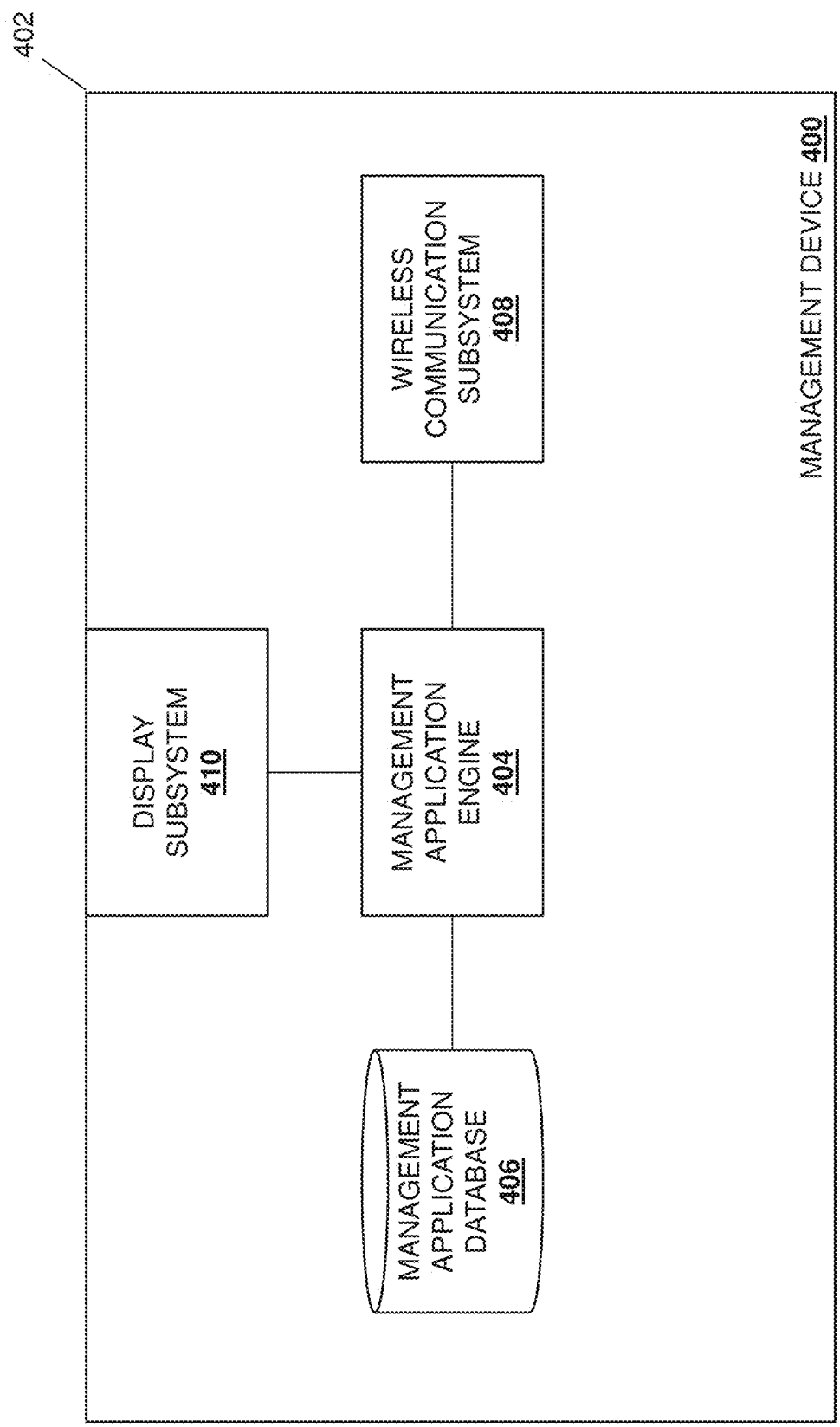
FIG. 4 is a schematic view illustrating an embodiment of a management device used in the WWAN-enabled remote switch management system of FIG. 2.

Referring now to FIG. 4, an embodiment of management device 400 is illustrated that may be the management device 206 discussed above with reference to FIG. 2. As such, the management device 400 may be the IHS 100 discussed above with reference to FIG. 1, and/or may include some or all of the components of the IHS 100, and in specific embodiments may be a mobile phone. In the illustrated embodiment, the management device 400 includes a chassis 402 that houses the components of the management device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an management application engine 404 that is configured to perform the functions of the management application engines and management devices discussed below. The chassis 402 may also house a storage device (not illustrated, but which may include the storage device 108 discussed above with reference to FIG. 1) that is coupled to the management application engine 404 (e.g., via a coupling between the storage device and the processing system) and that includes an management application database 406 that stores data and/or other information utilized to provide the functionality discussed below.

The chassis 402 may also house a wireless communication subsystem 408 that is coupled to the management application engine 404 (e.g., via a coupling between the wireless communication subsystem 408 and the processing system) and that may a cellular communications processing device such as a cellular System on a Chip (SoC), as well as a storage device storing a unique identifier such as a Subscriber Identity Module (SIM) card storing a SIM number. In a specific embodiment, the WWAN communication subsystem 408 may include antennas and/or other WWAN subsystems that are configured to utilize WWANs such as Long Term Evolution (LTE) networks, Worldwide Interoperability for Microwave Access (WiMAX) networks, Universal Mobile Telecommunications System (UMTS) networks, the Code Division Multiple Access version of International Mobile Telecommunications (IMT) for the year 2000 (CDMA2000) networks, Global System for Mobile Telecommunications (GSM) networks, Cellular Digital Packet Data (CDPD) networks, Mobitex networks, and/or other WWAN technologies that would be apparent to one of skill in the art in possession of the present disclosure. The chassis 402 may also house a display subsystem 410 that is coupled to the management application engine 404 (e.g., via a coupling between the display subsystem 410 and the processing system) and that is configured to display the management information discussed below. While a specific embodiment of an management device has been illustrated and described, one of skill in the art in possession of the present disclosure will recognize that management devices may include a variety of other components for providing conventional management device functionality, as well as the functionality discussed below, while remaining within the scope of the present disclosure.

Figure 5:
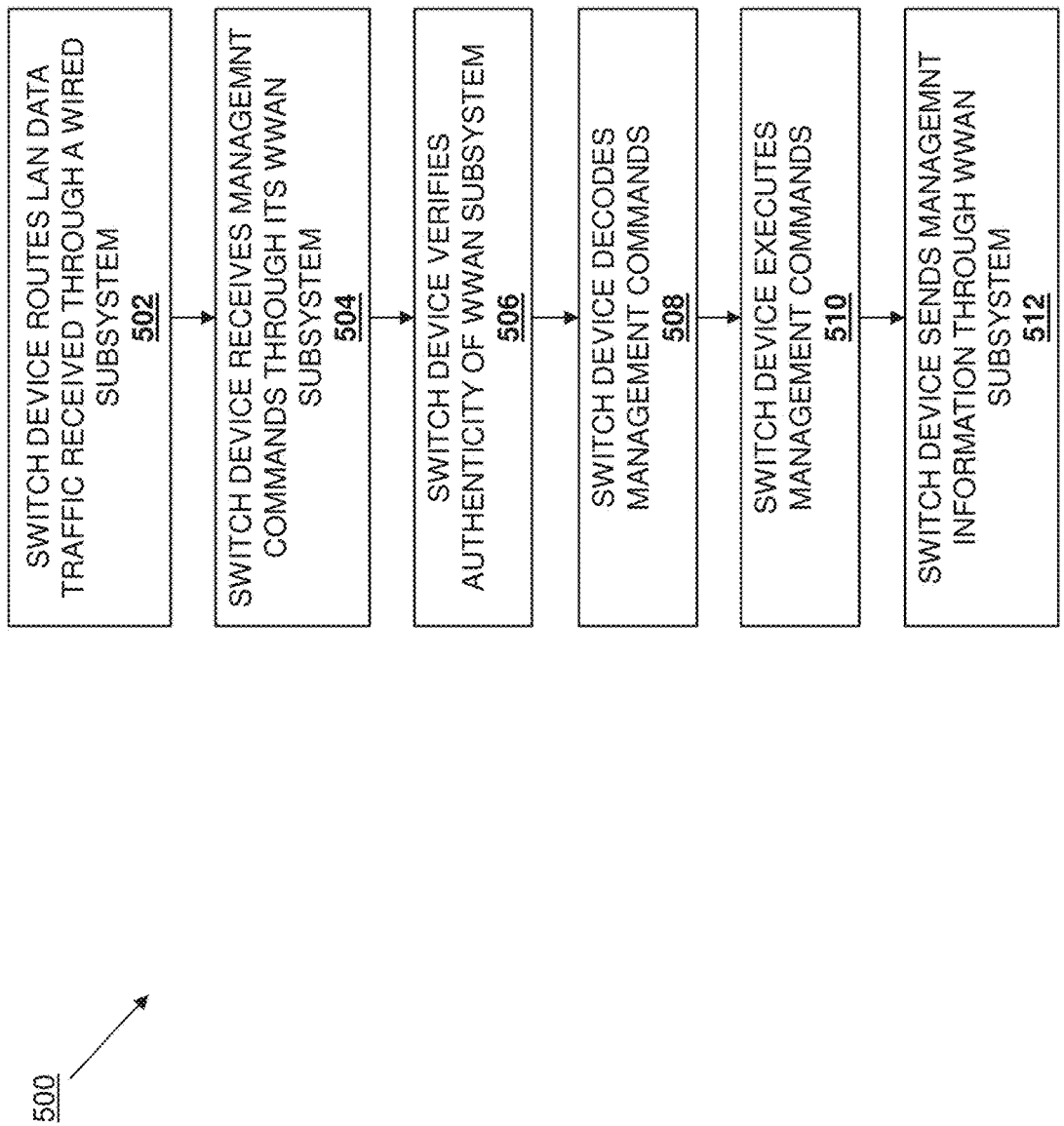
FIG. 5 is a flow chart illustrating an embodiment of a method for managing a remote switch device.

Referring now to FIG. 5, an embodiment of a method 500 for managing a switch is illustrated. As discussed above, the systems and methods of the present disclosure provide for the use of a Wireless Wide Area Network (WWAN) to remotely establish a secure data connection to a WWAN-enabled switch device in order to allow for the monitoring, configuration, and management of that switch device and, in some embodiments, other devices connected to that switch device in the same management domain (e.g., connected to the switch device via a Local Area Network (LAN).) As such, switch devices may be used to provide LANs in rural or other remote areas without wired Internet access (e.g., without wired Internet infrastructure or otherwise a lack of wired Internet connectivity), and the configuration, monitoring, and management of such switch devices (and their associated LANs) may be enabled remotely via WWAN communications. As such, the systems and methods of the present disclosure eliminate the need for local management via devices that are physically co-located with the switch device (as well the network administrator personnel needed to operate such management devices), along with the pre-configuration of the switch device (e.g., with an Internet Protocol (IP) address and other parameters) needed to enable such local management access.

The method 500 begins at block 502 where a switch device routes LAN traffic received through a wired communication subsystem. In some embodiments, at or before block 502, the switch device 202*a* of FIG. 2 may be provided alone and coupled to one or more devices in a LAN, or may be coupled to any or all of the switch devices 202*b* and up to 202*c*, as well as one or more devices in a LAN. For example, the switch device 202*a*/300 may be connected through any or all of the ports 308*a-c* on its wired communication subsystem 308 to any or all of the switch devices 202*b* and up to 202*c* (e.g., via port(s) 308*a-c* in the wired communication subsystem(s) 308 of those switch devices 202*b*/202*c*/300) via cabling (e.g., Ethernet cabling), as well as to devices in the LAN via cabling (e.g., Ethernet cabling.) In a specific example, the LAN may be provided in a remote area such as on a utility pole, in a warehouse, and/or in other situations where a wired Internet connection is unavailable, and connected to devices such as camera devices and/or other security subsystems. In another example, the LAN may be a relatively complex LAN including a variety of computing devices (e.g., the LAN may be provided to enabled communication in a hospital), but may be provided in a developing country or other rural area without developed wired Internet infrastructure. While a few specific examples of implementations of the LAN are provided above, one of skill in the art in possession of the present disclosure will recognize that the switch device 202*a* may be coupled to a LAN provided virtually anywhere where wired Internet connectively is not available while remaining within the scope of the present disclosure.

Thus, at block 502, the devices in the LAN may operate and generate data communications that may be sent to the switch device 202*a*/300 through port(s) 308*a-c* in its wired communication subsystem 308, and the switch device 202*a*/300 may operate in a variety of conventional manners to route that data traffic (e.g., via port(s) 308*a-c* on the wired communication subsystem 308) to other devices connected to the LAN. In some examples, the devices in the LAN may be connected to the switch device 202*a* directly (i.e., directly to a port 308*a-c* on the wired communication subsystem 308), or may be connected to the switch device 202*a* through another switch device 202*b-c*. As such, the switch device 202*a* may receive data traffic via the LAN directly from devices, or through other switch devices 202*b-c*. Similarly, the switch device 202*a* may route the data traffic at block 502 directly to devices (e.g., via its port(s) 308*a-c* to those directly connected devices), or through switch devices 202*b-c* to devices connected to those switch devices. Thus, one of skill in the art in possession of the present disclosure will recognize that the switch device 300 may provide (and/or be provided in) a wired LAN with virtually any LAN configuration, and operate to perform conventional switch device functionality to route data traffic throughout that LAN.

The method 500 proceeds to block 504 where the switch device receives management commands through its WWAN subsystem. In an embodiment, at block 504, a network administrator or other user may operate the management device 206 to send management commands to the switch device 202*a*. For example, the network administrator or user may utilize the management device 206/400 to connect to the switch device 202*a* through the WWAN infrastructure 204 and have the management application engine 404 send the management commands at block 504 through the wireless communications subsystem 408 to the WWAN infrastructure 204, which then operates to relay the management commands to the switch device 202*a*/300 (e.g., via its WWAN communications subsystem 310.) As such, at block 504, the switch management engine 304 in the switch device 202*a*/300 may receive the management commands via the WWAN communications subsystem 310 at block 504.

Figure 6B:
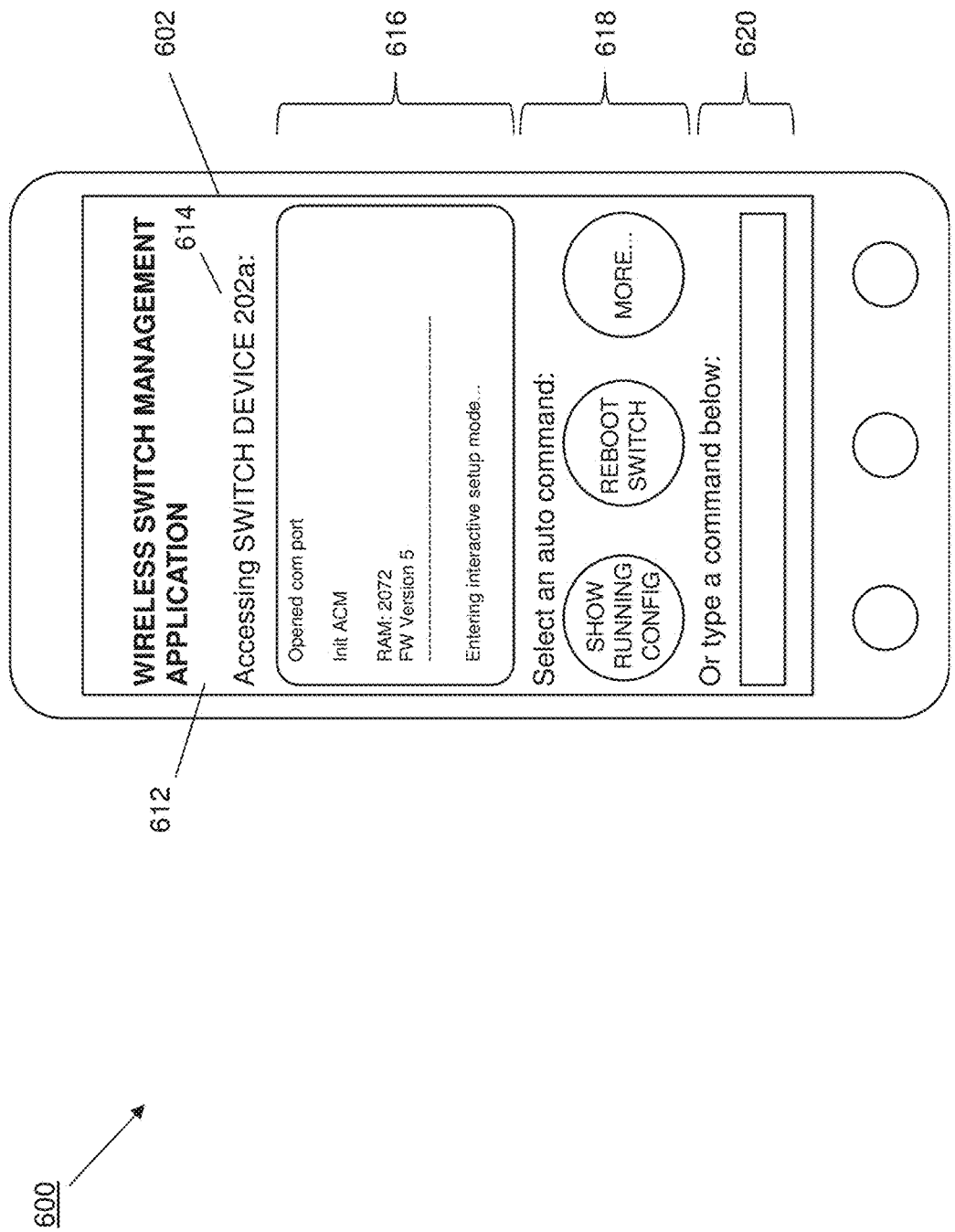
FIG. 6B is a screen shot view illustrating an embodiment of a switch device management screen displayed on the management device of FIG. 4.

With reference to FIGS. 6A and 6B, an example of a switch management application is illustrated that may be provided on the management device 206/400 by the management application engine 404 and used to provide management commands at block 504. The embodiment illustrated in FIGS. 6A and 6B includes a management device 600, which may be the management device 206 of FIG. 2 and/or the management device 400 of FIG. 4, including a display subsystem 602 that may be the display subsystem 410 in FIG. 4. A management application is provided by the management application engine 404 that, in the embodiment illustrated in FIG. 6A, includes a switch device connection screen 604. As discussed below, the management application may allow a network administrator or user of the management device 206/600 to select switch devices providing (or included in) one or more LANs that may be available for management using the management device 206/600.

For example, the switch device connection screen 604 includes a "warehouse" LAN graphical user interface (GUI) element 606 that may be associated with one or more switch devices in a LAN that is provided in a warehouse, a "parking lot" GUI element 608 that may be associated with one or more switch devices in a LAN that is provided in a parking lot, and a "trucks" GUI element 610 that may be associated with a LAN provided in one or more trucks. In the specific example, the network administrator or user has selected the "warehouse" GUI element 606 to cause the management application engine 404 to "expand" a section of the switch device connection screen 604 and provide a plurality of switch device GUI elements 606*a* and 606*b* associated with the switch devices 202*a* and 202*b*, respectively, discussed above with reference to FIG. 2. As discussed below, the network administrator or user may select the switch device GUI element 606*a* in order to connect to the switch device 202*a*, or select any other switch device GUI element displayed on the switch device connection screen 604 in order to connect to the switch device associated with those switch device GUI elements. Connection to a switch device via the management device 206/400 may include the automatic (i.e., in response to selection of the switch device GUI element 606*a*) creation of a secure data connection (e.g., a Secure Shell (SSH) connection) using a stored identifier for the switch device (i.e., in the management application database 406), as well as the logging in (e.g., provisioning a username and password via the management application) to a management interface (e.g., a CLI interface) on the switch device 202*a*. Following a successful connection between the management device 206 and the switch device 202*a*, a management channel may be established for performing the communications below. While a specific example of the selection of switch devices for the sending of management commands to those switch devices has been provided, one of skill in the art in possession of the present disclosure will recognize that the selection of switch devices for the sending of management commands may be performed in any of a variety of manners that will fall within the scope of the present disclosure as well.

In the embodiment illustrated in FIG. 6B, the management application is providing a switch device management screen 612 that may be provided in response to, for example, the network administrator or user selecting the switch device GUI element 606*a* discussed above with reference to FIG. 6A. As discussed above, the switch device GUI element 606*a* may provide the network administrator or user the ability to manage the switch device 202*a*, and as such, its selection may provide the switch device management screen 612 with a variety of GUI elements for configuring, managing, and monitoring the switch device 202a.

For example, the switch device management screen 612 includes switch device indicator 614 that indicates that the switch device management screen 612 is being provided for the switch device 202a. In addition, the switch device management screen 612 includes a command screen section 616 that may provide a Command Line Interface (CLI) screen that is configured to display communications and communications related information between the management device 206/600 and the switch device 202a. Furthermore, the switch device management screen 612 includes an auto-command section 618 that includes auto-command GUI elements that may be configured to send pre-configured management commands to switch devices in response to their selection. In the illustrated example, the auto-command GUI elements includes a "show running configuration" auto-command, a "reboot switch" auto-command, and a "more" GUI element for accessing additional auto-commands. As would be understood by one of skill in the art in possession of the present disclosure, the management application may include pre-configured auto-commands (e.g., predefined command and/or instructions sets that are configured to cause the switch device to perform desired functions and that are stored in the management application database 406), and may provide the user the ability to configure auto-commands (e.g., by defining CLI commands for execution upon the selection of the auto-command GUI element, and storing those in the management application database 406) while remaining within the scope of the present disclosure. The switch device management screen 612 also includes a manual command section 620 that includes an input GUI element that allows a user to provide a management command (e.g., by typing in a CLI command).

At block 504, the network administrator or user may select auto-command(s), provide manual commands, and/or otherwise use the management application to generate management commands for sending to the switch device 202a. Using the example provided in FIG. 6B, the command screen section 616 may display the management commands being provided at block 504, responses by the switch device 202a, actions of the switch device 202a, and/or any other configuration, management, or monitoring information about the switch device 202a as well. While a specific example of the providing management commands to switch devices has been provided, one of skill in the art in possession of the present disclosure will recognize that management commands may be provided to switch devices in any of a variety of manners that will fall within the scope of the present disclosure as well.

The method 500 proceeds to block 506 where the switch device verifies the authenticity of the WWAN communication subsystem. In an embodiment, at block 506, the switch management engine 304 in the switch device 202a/300 may operate to verify the authenticity of the WWAN communication subsystem 310 in the switch device 202a/300. In some embodiments, the verification of the WWAN communication subsystem 310 in the switch device 202a/300 may be performed upon the startup, reboot, reset, or other initialization of the switch device 202a. However, the verification of the WWAN communication subsystem 310 in the switch device 202a/300 may be performed periodically, each time a management command is received, and/or at any other frequency that would be apparent to one of skill in the art in possession of the present disclosure. Furthermore, in some embodiments, block 506 may be skipped (i.e., in situations where the authenticity of the WWAN communication subsystem 308 is not a concern.)

In example, the WWAN communications subsystem 310 may include an WWAN communications system identifier that may be known to the switch management engine 304 in the switch device 202a/300 (e.g., stored in the switch management database 306), and the switch management engine 304 may operate to verify the authenticity of the WWAN communications subsystem 310 at block 506 by ensuring that WWAN communications system identifier to ensure that the WWAN communications subsystem 310 has not been replaced or altered. In another example, at block 506, the switch management engine 304 in the switch device 300 may determine that a cellular communications processing device (e.g., a cellular chip) in the WWAN communications subsystem 310 includes an identification number such as, for example, an Electronic Serial Number (ESN), and determine that a storage device in the WWAN communications subsystem 310 (e.g., a SIM card) includes unique identifier. In response to determining that the ESN in the cellular chip and the unique identifier in the SIM card are present, the switch management engine 304 may operate to verify the authenticity of the WWAN communication subsystem 310 by determining that the ESN in the cellular chip and the unique identifier in the SIM card are associated (e.g., "paired) in the switch management database 306 and, in response, proceed with executing the management commands as discussed below. In response to determining that either the ESN in the cellular chip or the unique identifier in the SIM card are not present in the WWAN communication subsystem 410, or are present but not associated in the switch management database 306, the switch management engine 304 may operate to determine that the WWAN communication subsystem 310 is not authentic and may operate to discard the management commands and/or otherwise not execute the management commands. While a particular examples for verifying the WWAN communication subsystem has been described, one of skill in the art in possession of the present disclosure will recognize that a variety of different methods for verifying the WWAN communication subsystem before executing management commands received through the WWAN communication subsystem will fall within the scope of the present disclosure as well.

The method 500 proceeds to block 508 where the switch device decodes the management commands. In an embodiment, at block 508, the switch management engine 304 in the switch device 202a/300 may operate to decode management commands received at block 504. In some embodiments, the management commands sent by the management device 206 and received by the switch device 202a may be encoded (e.g., for security, for transmission through the WWAN infrastructure 204, and/or for a variety of other reasons that would be apparent to one of skill in the art in possession of the present disclosure), and the switch management engine 304 may be configured to decode those management commands for execution. In a specific example, the switch management engine 304 in the switch device 300 may be configured with an Application Programming Interface (API) that operates to decode, translate, or otherwise interpret the management commands (e.g., CLI commands) received through the WWAN communication subsystem 308 so that they may be executed by the switch device 202a/300. While a particular example for decoding management commands received through the WWAN communication subsystem has been described, one of skill in the art in possession of the present disclosure will recognize that a variety of different methods for decoding WWAN communication signals before executing management commands included in those WWAN communication signals will fall within the scope of the present disclosure as well. Furthermore, in some embodiments, the management commands may not be encoded, and thus block 508 of the method 500 may be skipped, or the API may simply pass the received management commands to the execution component of the switch management engine 304.

The method 500 proceeds to block 510 where the switch device executes the management commands. In an embodiment, at block 510, the switch management engine 304 operates to execute the management commands to perform at least one management action on the switch device 202a/300. For example, the switch management engine 304 may execute the management commands at block 510 to configure a port, set an Access Control List (ACL), reboot, show a running configuration, execute any other show command, execute port or interface configuration commands, execute VLAN commands, execute stacking commands, and/or provide or perform a variety of other switch management functionality that would be apparent to one of skill in the art in possession of the present disclosure. As such, management commands may be provided remotely from the management device 206 through the WWAN infrastructure 204 to the switch device 202a in order to cause the switch device 202a to perform management action(s) on the switch device.

The method 500 proceeds to block 512 where the switch device sends management information through the WWAN subsystem. In an embodiment, at block 512, the switch management engine 304 in the switch device 202a/300 may operate to send management information through its WWAN communication subsystem 310, through the WWAN infrastructure 204, and to the management device 206. The switch management engine 304 may operate at block 512 to send any information generated and/or collected in response to its operation or the operation of devices connected to it via the LAN. In some embodiments, management of switch devices may be enabled through the switch device that includes the WWAN communication subsystem. For example, the switch devices 202b and up to 202c may not include a WWAN communication subsystem, but may be connected to the switch device 202a that includes the WWAN communication subsystem (or to a management domain that the switch device 202a is part of.) In such situations, the switch management engine 304 in the switch device 202a/300 may utilize discovery protocols such as the Link Layer Discovery Protocol (LLDP) to learn the LAN topology and each of the switch devices 202b and up to 202c connected to/providing the LAN, as well as devices and device parameters for devices connected to the LAN. The switch management engine 304 in the switch device 202a/300 may then operate to send management information through its WWAN communication subsystem 310, through the WWAN infrastructure 204, and to the management device 206. As such, the management device 206 may operate to display details about the devices connected to the switch device 202a via the LAN. Furthermore, in some embodiments, the management application engine 404 in the management device 206/400 may operate to create secure channels (e.g., Secure Shell (SSH) channels) to each device in the LAN via the switch device 202a, and provide management commands to those devices as well. As such, the switch management engine 304 in the switch device 202a/300 may operate to relay management commands to any connected devices to provide for the remote management of those connected devices as well.

Thus, systems and methods have been described that provide a switch device with an internal (i.e., in-chassis) WWAN communication subsystem that allows the use of a WWAN to remotely establish a secure data connection to a management device in order to allow for the monitoring, configuration, and management of the switch device as well as any other devices connected to that switch device in the same management domain (e.g., connected to the switch device via a Local Area Network (LAN).) The systems and methods of the present disclosure allow for the provisioning of LANs in rural or other remote areas without wired Internet access (e.g., without wired Internet infrastructure or otherwise a lack of wired Internet connectivity), and eliminate the need for local management via devices that are physically co-located with the switch device (as well the network administrator personnel needed to operate such management devices), as well as the pre-configuration of the switch device (e.g., with an Internet Protocol (IP) address and other parameters) needed to enable such local management access.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Wireless Wide Area Network (WWAN)-enabled remote switch management system, comprising:
   a management device including a management device Wireless Wide Area Network (WWAN) communication subsystem that is configured to transmit management commands from the management device through a WWAN; and
   a switch device including:
     a chassis;
     a switch device wired communication subsystem that is located in the chassis, that is coupled to a Local Area Network (LAN), and that is not coupled to the Internet, wherein the switch device is configured to route LAN traffic between a first LAN subsystem coupled to the switch device wired communication subsystem and a second LAN subsystem coupled to the switch device wired communication subsystem;
     a switch device WWAN communication subsystem that is located in the chassis and that is configured to receive management commands from the management device through the WWAN; and
     a switch management engine that is located in the chassis, that is coupled to the switch device WWAN communication subsystem, and that is configured to:
       receive the management commands from the switch device WWAN communication subsystem;
       verify, in response to receiving the management commands, an authenticity of the switch device WWAN communication subsystem; and
       execute, in response to the verifying the authenticity of the switch device WWAN communication subsystem, the management commands to perform a management action on the switch device.

2. The system of claim 1, wherein the switch device WWAN communication subsystem includes:
   a cellular communications processing device; and
   a storage device storing a unique identifier.

3. The system of claim 2, wherein the cellular communications processing device includes a cellular chip, and therein the storage device storing the unique identifier includes a Subscriber Identity Module (SIM) card.

4. The system of claim 3, wherein the cellular chip includes an Electronic Serial Number (ESN), and wherein the verifying, in response to receiving the management commands, the authenticity of the switch device WWAN communication subsystem includes:
   determining, in response to receiving the management commands through the cellular chip, that the cellular chip includes the ESN; and
   determining that the SIM card that stores the unique identifier is present, wherein the executing the management commands to perform the management action on the switch device includes:
      executing, in response to the cellular chip including the ESN and the SIM card being present, the management commands.

5. The system of claim 1, wherein the management commands include Command Line Interface (CLI) commands.

6. The system of claim 1, wherein the management commands received from the switch device WWAN communication subsystem are encoded, and wherein the switch management engine includes:
   an Application Programming Interface (API) that is configured to decode the management commands in order to allow the execution of the management commands.

7. The system of claim 1, wherein the switch management engine is configured to:
   receive LAN information through the switch device wired communication subsystem; and
   transmit the LAN information through the switch device WWAN communication subsystem to the management device.

8. A switch Information Handling system (IHS), comprising:
   a chassis;
   a switch device wired communication subsystem that is located in the chassis, that is coupled to a Local Area Network (LAN), and that is not coupled to the Internet;
   a switch device WWAN communication subsystem that is located in the chassis and that is configured to receive management commands from a management device through the WWAN; and
   a switch processing system that is located in the chassis and that is coupled to the switch device WWAN communication subsystem and the switch device wired communication subsystem;
   a switch memory system that is located in the chassis, that is coupled to the switch processing system, and that includes instructions that, when executed by the switch processing system, cause the switch processing system to:
      route LAN traffic between a first LAN subsystem coupled to the switch device wired communication subsystem and a second LAN subsystem coupled to the switch device wired communication subsystem;
      receive, through the switch device WWAN communication subsystem, management commands from the management device;
      verify, in response to receiving the management commands, an authenticity of the switch device WWAN communication subsystem; and
      execute, in response to the verifying the authenticity of the switch device WWAN communication subsystem, the management commands to perform a management action.

9. The switch IHS of claim 8, wherein the switch device WWAN communication subsystem includes:
   a cellular communications processing device; and
   a storage device storing a unique identifier.

10. The switch IHS of claim 9, wherein the cellular communications processing device includes a cellular chip, and therein the storage device storing the unique identifier includes a Subscriber Identity Module (SIM) card.

11. The switch IHS of claim 10, wherein the cellular chip includes an Electronic Serial Number (ESN), and wherein the verifying, in response to receiving the management commands, the authenticity of the switch device WWAN communication subsystem includes:
   determining, in response to receiving the management commands through the cellular chip, that the cellular chip includes the ESN; and
   determining that the SIM card that stores the unique identifier is present, wherein the executing the management commands to perform the management action on the switch device includes:
   executing, in response to the cellular chip including the ESN and the SIM card being present, the management commands.

12. The switch IHS of claim 8, wherein the management commands include Command Line Interface (CLI) commands.

13. The switch IHS of claim 8, wherein the management commands received from the switch device WWAN communication subsystem are encoded, and wherein the instructions, when executed by the switch processing system, cause the switch processing system to:
   provide an Application Programming Interface (API) that is configured to decode the management commands in order to allow the execution of the management commands.

14. A method for managing a switch device, comprising:
   routing, by a switch device that includes a switch chassis and that is not coupled to the Internet, LAN traffic between a first LAN subsystem coupled to a switch device wired communication subsystem that is located in the switch chassis and a second LAN subsystem coupled to the switch device wired communication subsystem;
   receiving, by the switch device over a Wireless Wide Area Network (WWAN) from a management device, management commands through a switch device WWAN communication subsystem that is located in the switch chassis;
   verifying, in response to receiving the management commands, an authenticity of the switch device WWAN communication subsystem; and
   executing, by the switch device in response to the verifying the authenticity of the switch device WWAN communication subsystem, the management commands to perform a management action on at least one switch subsystem that is located in the switch chassis.

15. The method of claim 14, wherein the switch device WWAN communication subsystem includes:
   a cellular communications processing device; and
   a storage device storing a unique identifier.

16. The method of claim 15, wherein the cellular communications processing device includes a cellular chip, and therein the storage device storing the unique identifier includes a Subscriber Identity Module (SIM) card.

17. The method of claim 16, wherein the cellular chip includes an Electronic Serial Number (ESN), and wherein the verifying, in response to receiving the management commands, the authenticity of the switch device WWAN communication subsystem includes:
  determining, by the switch device in response to receiving the management commands through the cellular chip, that the cellular chip includes the ESN; and
  determining, by the switch device, that the SIM card that stores the unique identifier is present, wherein the executing the management commands to perform the management action on the at least one switch subsystem that is located in the switch chassis includes:
  executing, by the switch device in response to the cellular chip including the ESN and the SIM card being present, the management commands.

18. The method of claim 14, wherein the management commands include Command Line Interface (CLI) commands.

19. The method of claim 14, wherein the management commands received through the switch device WWAN communication subsystem are encoded, and wherein the method further comprises:
  decoding, by an Application Programming Interface (API) that is provided in the switch device, the management commands in order to allow the execution of the management commands.

20. The method of claim 14, further comprising:
receiving, by the switch device, LAN information through the switch device wired communication subsystem; and
transmitting, by the switch device, the LAN information through the switch device WWAN communication subsystem to the management device.

* * * * *